(12) United States Patent
Kaupas et al.

(10) Patent No.: US 8,051,093 B2
(45) Date of Patent: Nov. 1, 2011

(54) METHOD AND APPARATUS FOR EXTRACTING DATA FROM A DATA STORE

(75) Inventors: George M. Kaupas, Austin, TX (US); Sundeep Kunchala, Round Rock, TX (US); Andrew P. Haskins, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 676 days.

(21) Appl. No.: 11/962,314

(22) Filed: Dec. 21, 2007

(65) Prior Publication Data

US 2009/0164423 A1   Jun. 25, 2009

(51) Int. Cl.
  G06F 7/00     (2006.01)
  G06F 17/30    (2006.01)
  G06F 9/44     (2006.01)
(52) U.S. Cl. .................. 707/769; 707/765; 717/173
(58) Field of Classification Search ........... 707/999.1–3, 707/769, 765
See application file for complete search history.

(56) References Cited

U.S. PATENT DOCUMENTS

| | | | |
|---|---|---|---|
| 6,904,433 B2* | 6/2005 | Kapitskaia et al. | 1/1 |
| 2005/0004774 A1* | 1/2005 | Volk et al. | 702/108 |
| 2006/0010416 A1* | 1/2006 | Keck et al. | 716/19 |
| 2007/0118549 A1* | 5/2007 | Bornhoevd et al. | 707/101 |

\* cited by examiner

*Primary Examiner* — Etienne Leroux
*Assistant Examiner* — Mohammad Rahman
(74) *Attorney, Agent, or Firm* — Williams, Morgan & Amerson, P.C.

(57) ABSTRACT

A method includes defining a general query for extracting data from at least one data store operable to store workpiece data associated with the processing of workpieces in a manufacturing system. The general query specifies at least one ambiguous parameter having a plurality of potential values. Metadata associated with the workpiece data is accessed. The metadata is employed to identify a plurality of candidate values for the at least one ambiguous parameter. A plurality of atomic queries is generated. Each atomic query is associated with one of the candidate values. The plurality of atomic queries is executed to extract data from the at least one data store and generate an output report including the extracted data.

22 Claims, 4 Drawing Sheets

Lot History 300

| ID 304 | Process Flow 306 | Start Time 308 | Finish Time 309 |
|---|---|---|---|
| ... | ... | ... | ... |
| ... | ... | ... | ... |
| ... | ... | ... | ... |

302

Procedure 310

| Process Flow 314 | Procedure 316 |
|---|---|
| ... | ... |
| ... | ... |
| ... | ... |

METHOD AND APPARATUS FOR EXTRACTING DATA FROM A DATA STORE

CROSS-REFERENCE TO RELATED APPLICATIONS

Not applicable.

BACKGROUND OF THE DISCLOSURE

The disclosed subject matter relates generally to manufacturing and, more particularly, to a method and apparatus for extracting data from a data store.

The manufacture of semiconductor devices requires a number of discrete process steps to create a packaged semiconductor circuit device from raw semiconductor material. The various processes, from the initial melt and refinement of the semiconductor material, the slicing of the semiconductor crystal into individual wafers, the fabrication stages (etching, doping, ion implanting or the like), to the packaging and final testing of the completed device, are so different from one another and specialized that the processes may be performed in different facilities in remote regions of the globe.

For example, the process of growing and refining a large semiconductor crystal (e.g., Si, GaAs, or the like) may be performed by a facility specializing in such crystal growth techniques. The resultant crystals may then be sold directly to a semiconductor manufacturer, either as large crystals, or as wafers, sliced from a large crystal. The semiconductor manufacturer may then slice the semiconductor crystal into wafers, if the semiconductor material is not already in wafer format. The semiconductor manufacturer then fabricates semiconductor circuit devices (e.g., microprocessor, DRAM, ASIC or the like) on individual wafers, usually forming a number of devices on each wafer.

Generally, a set of processing steps is performed on a wafer using a variety of processing tools, including photolithography steppers, etch tools, deposition tools, polishing tools, rapid thermal processing tools, implantation tools, etc. During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. During the fabrication flow, various metrology parameters are collected for verifying the proper formation of the features on the wafer and/or to control the process tools to reduce variation and increase device performance and reliability.

After fabrication of the devices is complete, each wafer is subjected to preliminary functional tests, commonly referred to as final wafer electrical tests (FWET) that evaluate test structures on the wafer and SORT tests that evaluate each die. Wafers that pass these tests are then cut to singulate the individual die, which are then packed in substrates. Packed die are then subjected to additional tests against the specification of customers' orders to determine performance characteristics such as maximum operating speed, power, caches, etc. This packaging process is fairly labor intensive, and thus it may be desirable to perform the mounting, wire-bonding, and final testing at a remote facility. Once completed, the packaged semiconductor device may again be tested, and then labeled and shipped to customers through a distribution system.

One problem which arises in this prior art manufacturing technique, is that the various processes take place at different discrete locations. Thus, it is difficult to track a semiconductor device through the fabrication process, from single crystal to finished product. Such tracking may be necessary for quality control purposes in order to determine the causes of production problems which may result in low yields or circuit defects.

In present fabrication facilities, individual fabrication machines or computer aided manufacturing systems (CAM systems) may provide data regarding operating conditions during the fabrication process. Some of these data are intrinsic data, for example, lot numbers, device model numbers or the like. Other data may be extrinsic data, such as production test data, production conditions, or the like.

The large amount of data collected during manufacturing process requires the use of enterprise wide data collection and storage resources. Typically, such engineering databases store vast quantities of data. The vast quantity data gives rise to various data management issues. Often, a process engineer may want to gather data to evaluate a particular lot or process. However, the particular path a lot or group of lots traverses through the production flow it is not readily discernible. Hence, when a query is specified for extracting the data, wildcards are often used. The use of wildcards in data queries increases flexibility, but also greatly reduces the time required to gather data, as the wildcards need to be resolved by the database system. In addition, due to the number of different facilities involved in the fabrication process, data may be stored in different data warehouses that need to be linked to determine first if any data exists that satisfies the query, and second to extract the data. Given these conditions, data queries may consume significant processing resources and may also take a significant amount of time to complete.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF THE DISCLOSURE

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method that includes defining a general query for extracting data from at least one data store operable to store workpiece data associated with the processing of workpieces in a manufacturing system. The general query specifies at least one ambiguous parameter having a plurality of potential values. Metadata associated with the workpiece data is accessed. The metadata is employed to identify a plurality of candidate values for the at least one ambiguous parameter. A plurality of atomic queries is generated. Each atomic query is associated with one of the candidate values. The plurality of atomic queries is executed to extract data from the at least one data store and generate an output report including the extracted data.

Another aspect of the disclosed subject matter is seen in a system including at least one data store, an interface, an extraction tool, and an extraction engine. The data store is operable to store workpiece data associated with the processing of workpieces in a manufacturing system. The interface is operable to define a general query for extracting data from the at least one data store. The general query specifies at least one ambiguous parameter having a plurality of potential values. The extraction tool is operable to access metadata associated with the workpiece data, employ the metadata to identify a plurality of candidate values for the at least one ambiguous parameter, and generate a plurality of atomic queries. Each atomic query is associated with one of the candidate values. The extraction engine is operable to execute the plurality of atomic queries to extract data from the at least one data store and generate an output report including the extracted data.

BRIEF DESCRIPTION OF THE SEVERAL VIEWS OF THE DRAWINGS

The disclosed subject matter will hereafter be described with reference to the accompanying drawings, wherein like reference numerals denote like elements, and.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
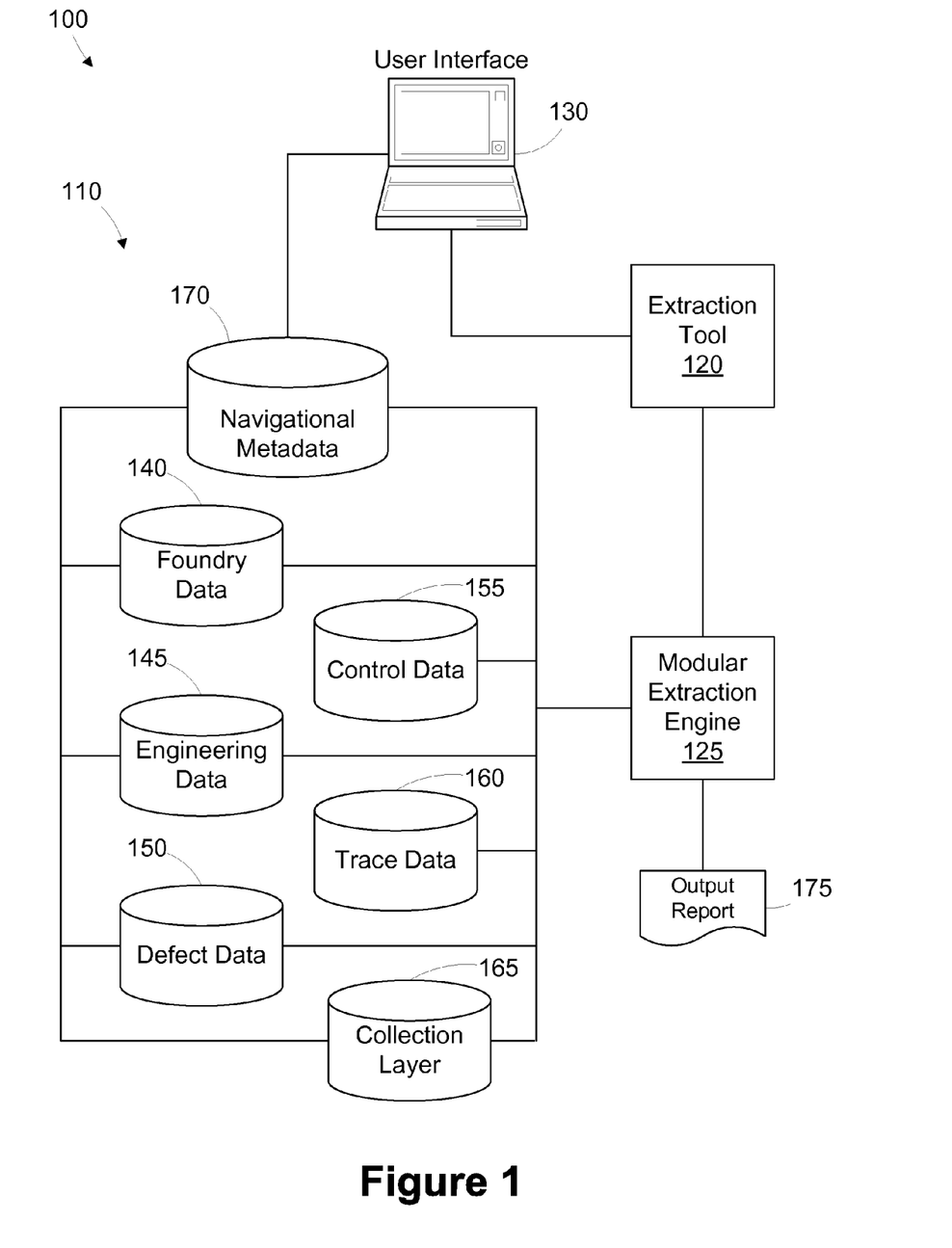
FIG. 1 is a simplified block diagram of a data management system in accordance with one illustrative embodiment of the present subject matter.

Referring now to the drawings wherein like reference numbers correspond to similar components throughout the several views and, specifically, referring to FIG. 1, the disclosed subject matter shall be described in the context of a data management system 100. The data management system 100 includes a plurality of data stores 110, an extraction tool 120, a modular extraction engine 125, and a user interface 130. In the illustrated embodiment, the data management system 100 stores data associated with a plurality of facilities, processes, and/or systems associated with the manufacturing of integrated circuit devices; however, the application of the present subject matter is not limited to a semiconductor manufacturing environment. The data management techniques may be applied to other environments that process or manufacture other types of workpieces.

Generally, the data stores 110 are implemented as relational databases. The illustrative data stores 110 include a foundry data store 140 that stores data associated with FWET and SORT test results, an engineering data store 145 that stores metrology information collected during the fabrication and testing of the devices, and a defect management system data store 150 that stores defect data associated with the wafers, devices, and/or tools. A process control data store 155 stores data associated with the automatic process control activities associated with process tools used to fabricate the devices, and a process control trace data store 160 stores tool state data collected to support the control activities. In some cases, similar data may be present in multiple data stores 110. For example, the FWET and SORT data may be stored in the engineering data store 145 and the foundry data store 140. Other data stores 110 may extract and repackage data into formats suitable for use by different groups. For example, a collection layer data store 165 may be employed that groups data in the engineering data store 145 by layer. The specific types of data stores 110 described in reference to FIG. 1 are provided for illustrative purposes. The application of the subject matter described herein is not limited to the particular data store types mentioned.

The user interface 130 allows a user to specify queries that extract data of interest from the data stores 110. The extraction tool 120 employs a navigation metadata data store 170 that stores, among other things, selected lot history information associated with the lots that are processed through the fabrication process. Wafers processed through the manufacturing system are typically grouped into lots (e.g., 25-40 wafers). Within a test facility, individual die are also grouped into lots, albeit much larger in size (e.g., 1000 die). Typically, there is no correlation between lot numbers during fabrication and lot numbers during testing. Although the following description focuses on grouping wafers by lots, the principles may also be applied to single wafer processing environments.

In general, the navigation metadata data store 170 allows the extraction tool 120 to determine, without querying the data stores 110, the potential locations for data of interest specified by the user. The term "metadata" refers to data about data. In the context of the data management system 100, the metadata relates to lot history data that indicates if a lot has been processed at a process flow event in the past, thereby indicating that data regarding that lot may exist in the data stores 110. By evaluating the metadata, the extraction tool 120 may determine if it is likely that data exists for a particular time frame, lot, and process flow event.

The navigation metadata data store 170 may be populated periodically (e.g., once per shift) by running a lot history query on the data stores 110. The extraction tool 120 or a different entity may perform the periodic population queries. Using the navigation metadata data store 170 allows the extraction tool 120 to generate targeted queries for accessing the data stores 110, which may be served in a greatly reduce time frame as compared to less focused queries that may have multiple wildcards or similar ambiguities.

In the illustrated embodiment, the extraction tool 120, modular extraction engine 125, and user interface 130 are implemented using computers programmed with software to implement the functions described. However, as will be appreciated by those of ordinary skill in the art, a hardware controller designed to implement the particular functions may also be used. Moreover, the functions performed by the extraction tool 120, modular extraction engine 125, and user interface 130, as described herein, may be performed by a combined entity or by multiple devices distributed throughout a system.

Portions of the disclosed subject matter are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2:
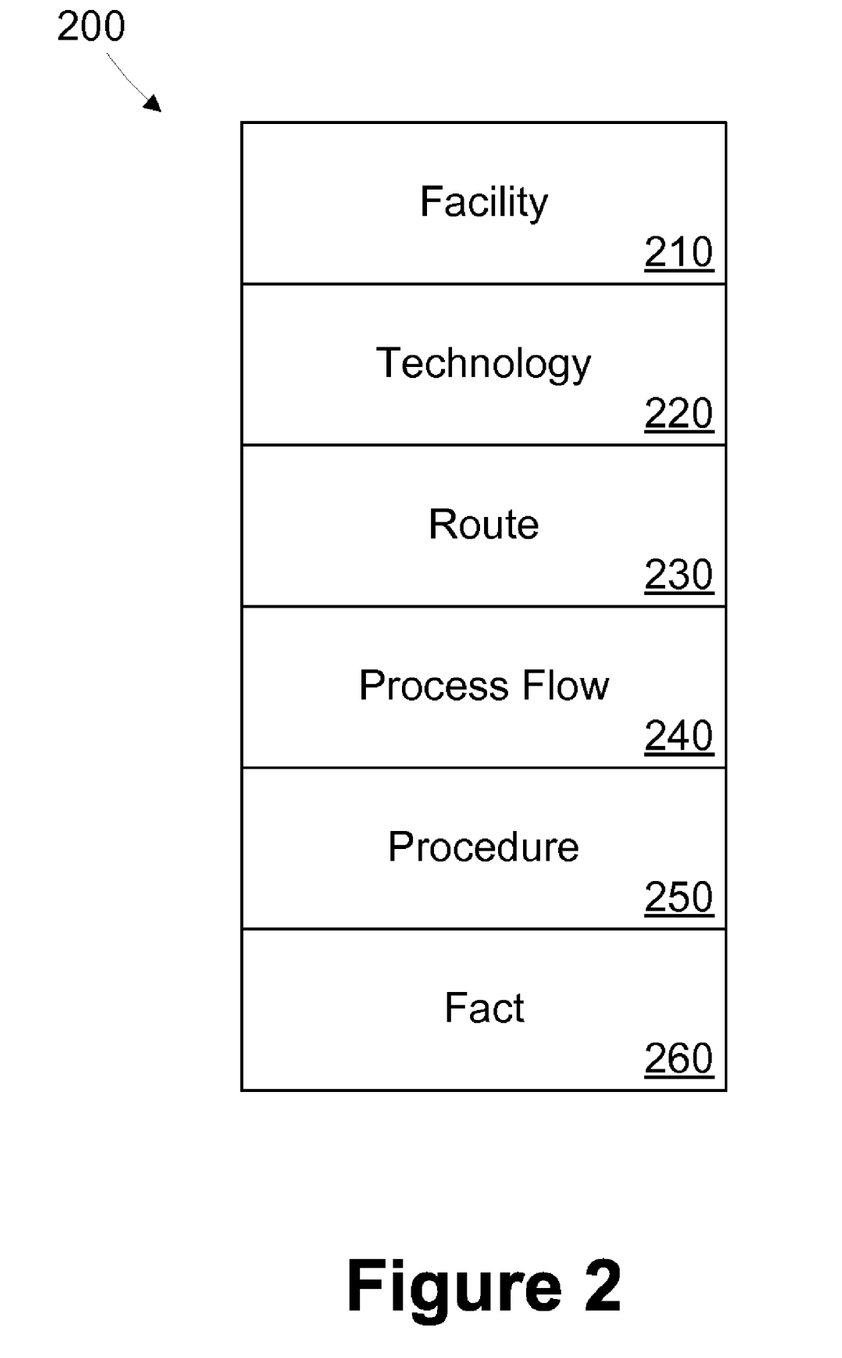
FIG. 2 is a diagram illustrating an exemplary data hierarchy used in the system of FIG. 1.

Turning now to FIG. 2, a diagram illustrating an exemplary data hierarchy 200 is provided. The hierarchy includes a facility level 210, a technology level 220, a route level 230, a process flow level 240, a procedure level 250, and a fact level 260. The facility level 210 separates data by the particular facility (e.g., fabrication facility, test facility, etc.) The technology level 220 designates the particular technology node employed (e.g., 45 nm, 65 nm, etc.). The route level 230 defines a plurality of routes that a wafer may take through the facility depending on the product being formed. A route basically consists of a plurality of process flow events at the process flow level 240 that are grouped together to define the process flow of a particular type of device. In a fabrication facility, a route includes the selected photolithography operations, etch operations, deposition operations, implant operations, heat treatment operations, metrology operations, FWET or SORT tests, etc., employed during the fabrication of the integrated circuit device on a wafer. Within a test facility, the route may specify the dicing, packaging, and testing operations to which a particular die is subjected to generate a deliverable product. The fact level 260 represents the actual fact data generated.

Within a particular process flow event, there are various tests or activities that may take place. For purposes of this illustration, the tests, metrology events, or process events that fall within a particular process flow event are generically referred to as procedures. Within a particular process flow event, not all of the members of the lot may receive the same procedures. For example, in a fabrication event, not all wafers in a lot may be subjected to metrology. Also, within a process flow event, different lots may be processed in different tools, or different wafers in a lot may be processed in different chambers of a multi-chamber tool. The processing of one wafer in a particular chamber is considered a different procedure than processing a second wafer in a different chamber.

Within a test environment, a particular test process flow event may define hundreds of test procedures that may or may not be performed on a particular die within a test lot. Initial class tests (ICL) that are preliminary tests for power and speed. ICL testing is usually followed by burn-in (BI) and post burn-in (PBI) tests that test packaged die under specified temperature and/or voltage stress, and automatic test equipment (ATE) tests that test die functionality. Then, packaged die with different characteristics go through system-level tests (SLT) in which they are tested against customer requirements on specific electrical characteristics. In SLT, packaged die are tested in an actual motherboard by running system-level tests (e.g., variance test programs). The test protocols followed for each particular die may vary depending on the intended application for the die (e.g., mobile, server, desktop, etc.) or based on prior test data. For example, the testing performed at a particular process flow event may depend on the results gathered at a prior event.

A significant factor that affects the time it requires to service a query to the data stores 110 is the degree of ambiguity in the request. Typically, a user requesting data can only specify some of the information needed to locate data in the data stores 110. For example, a user may specify a particular lot or a list of lots and a process flow event. In some cases, the user may also specify a date range. Yet in other cases, the user may want all data associated with a lot, so the process flow designator receives a wildcard. In some cases, the user may know the particular process flow event, but may use a wildcard (e.g., "*") or partial wildcard (e.g., "a*") to designate the procedure name. The user does not typically know how much, if any, data is available for the specified query conditions.

To reduce the time to service a query, the extraction tool 120 breaks down a general request into a series of discrete requests that do not include wildcards prior to actually accessing the data stores 110. To better determine possible locations for data that might satisfy the query, the extraction tool 120 uses the navigation metadata data store 170. In the illustrated embodiment shown in FIG. 3, the navigation metadata data store 170 includes a lot history table 300 and a procedure table 310.

Figure 3:
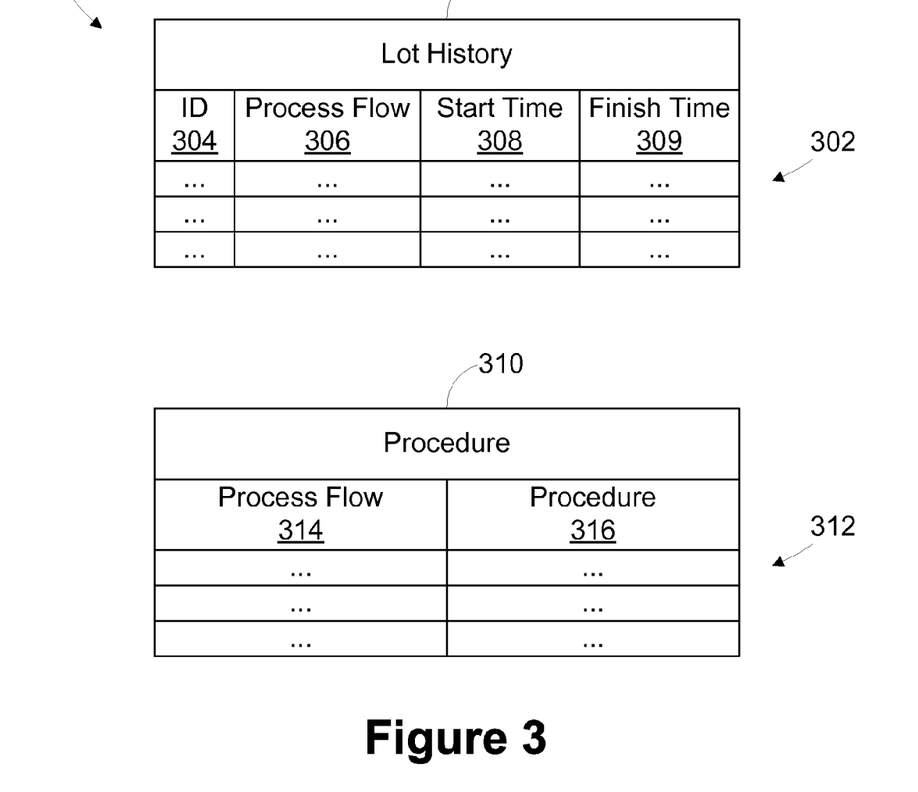
FIG. 3 is a diagram illustrating navigational metadata employed in the system of FIG. 1.

Each entry 302 in the lot history table 300 includes an identification field 304 (e.g., lot ID), a process flow field 306, a start timestamp field 308 and a finished timestamp field 309 (i.e., that specify when the lot entered and exited the process flow event). In some cases, a single time stamp field may be used, depending on the particular nature of the process flow event. Generally, the lot history table 300 identifies the particular lots that were present at a particular process flow event at a particular time interval. As described above, the lot history table 300 may be populated periodically to update the history information.

Each entry 312 in the procedure table 310 includes a process flow field 314 and a procedure field 316. The procedure table 310 specifies the candidate procedures that have previously been associated with a particular process flow event. As described above, each procedure may not be performed at every instance of a process flow event, and each wafer or device in a lot may not be exposed to each procedure that is performed. The procedure table 310 may be populated periodically to update the links between process flow events and the associated procedures.

Figure 4:
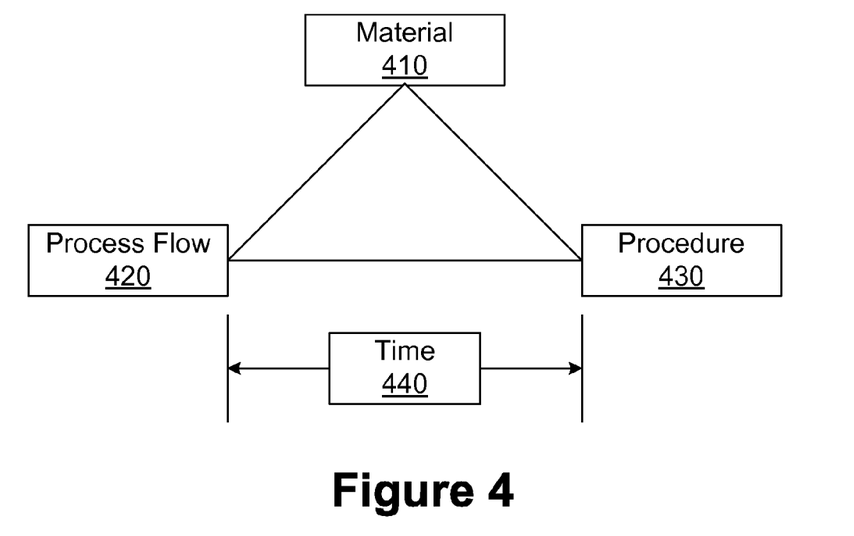
FIG. 4 is a diagram illustrating a data query.

The structure used for each data query is illustrated conceptually in FIG. 4. Particular data in one or more of the data stores 110 may be identified by a combination of a material designator 410, a process flow designator 420, and a procedure designator 430. A time window 440 may also be defined. Typically, the user specifies a general query that provides incomplete information associated with one or more of the designators 410, 420, 430. In specifying a process flow event, the user may first select a facility, technology, and route before actually reaching the process flow event of interest, as illustrated by the hierarchy shown in FIG. 2.

The extraction tool 120 uses the lot history table 300 and/or the procedure table 310 to fill in the missing designators 410, 420, 430 to construct a plurality of atomic queries based on the general query. While the general query typically employs wildcards, the atomic queries resolve all ambiguities and use all equal to operators.

In one example, the user may specify a lot or group of lots and a process flow event, thereby satisfying the material designator 410 and the process flow designator 420. However, ambiguity remains with respect to the procedure designator 430. The extraction tool 120 accesses the procedure table 310 based on the specified process flow designator 420 to identify the candidate procedures for the given process flow event. The extraction tool 120 then generates an atomic query for each of the candidate procedures that fall under the designated process flow event. If multiple lots are specified, a set of atomic queries is specified for each designated lot. Note that in some embodiments, the extraction tool 120 may generate atomic queries for only those lots that have history records for the designated process flow event in the lot history table 300; lots without associated history would be ignored. However, there is a potential that for recently processed lots, the history metadata may not have been loaded into the navigation metadata data store 170. In such cases, the extraction tool 120 may generate associated queries for such lots even in the absence of history metadata. If a time window 440 has been specified, and the time window 440 is sufficiently removed from the current time (e.g., >1 day), it is unlikely that data would have been collected without the lot history metadata having been updated. In such a case, the extraction tool 120 may ignore the lots without history metadata.

In another example, the user may specify a process flow event and a time window 440. The extraction tool 120 may use the lot history table 300 to identify specific lots that have history within the time window 440. Based on the lots identified, the extraction tool 120 may generate atomic queries for each lot and candidate procedure.

In a general sense, the extraction tool 120 can process ambiguity with respect to any of the elements of the query by resolving the ambiguity using the navigational metadata (e.g., lot history and/or procedure data). The navigational metadata allows the extraction tool 120 to construct targeted unambiguous atomic queries prior to accessing the data stores 110. The particular ambiguities that the extraction tool 120 may address can vary. For example, the user may specify a lot, but no specific process flow event. The extraction tool 120 can use the navigation metadata data store 170 to determine the process flow events that the lot has completed. Atomic queries may be constructed for each process flow event having history and for each associated procedure under each process flow event.

After generating the atomic queries, the extraction tool 120 passes the queries to the modular extraction engine 125. The modular extraction engine 125 provides an interface to the data stores 110 for executing the atomic queries generated by the extraction tool 120. The modular extraction engine 125 is referred to as being modular because it may have different engines for extracting data from different data stores 110. For example, one module may be configured for accessing the engineering data store 145, while another module may be configured for accessing the process control data store 155. Moreover, the modules may be further specialized in that they may be adapted to retrieve a particular type of data (e.g., wafer electrical test data, inline process data, or sort data) from a particular data store 110 or data having a specific structure (e.g., database schema). The modules allow a customized front-end for interfacing with a variety of database structures and a generalized back-end that allows data to be reported using a uniform format. Changes to one of the data stores 110 in terms of structure only require changes in the font-end of the associated module of the modular extraction engine 125.

The atomic queries each specify a subset of the data using equal to operators for each of the designators 410, 420, 430 (i.e., lot=X, process flow event=Y, procedure=Z). Due to this unambiguous nature, they may be executed in any order and are typically serviced quickly. Because the ambiguities in the designators 410, 420, 430 have been removed by virtue of generating a separate atomic query for each candidate case, processing demands placed on the data stores 110 are greatly reduced. The particular data store 110 does not need to process the wildcards to identify the data domain covered by the queries, because the ambiguous parameters are resolved using the navigational metadata prior to accessing the data stores 110.

The modular extraction engine 125 may process the atomic queries in parallel using multiple engine modules. The modular extraction engine 125 may even initiate a first set of atomic queries, while the extraction tool 120 is generating another set associated with the same general query. For example, if the user specifies a list of lots for which data is to be extracted, the extraction tool 120 may specify the candidate values for the procedures based on the specified process flow event for the first lot. Subsequently, the extraction tool 120 can pass the first set of atomic queries to the modular extraction engine 125 to begin extraction while the other queries are being formulated. In the case where multiple designators 410, 420, 430 have ambiguities, the atomic queries may be generating using a nested loop, where a first candidate value for one of the designators 410, 420, 430 is fixed and a set of atomic queries is generated for the candidate values of the second ambiguous designator 410, 420, 430. This first set may be sent to the modular extraction engine 125. The extraction tool 120 may then change the value of the candidate value for the first ambiguous designator and repeat the loop for the candidate values of the second ambiguous designator 410, 420, 430. In general the relationship between the ambiguities in the general query to the number of atomic queries generated is multiplicative. If M candidates exist for one designator and N candidates exist for the second designator 420, the number of atomic queries is M×N.

In the illustrated embodiment, the modular extraction engine 125 implements parallelization and pipelining in the execution of the atomic queries. With respect to parallelism, within the modular extraction engine 125, the atomic queries flowing through it might run through 4 parallel "pipes" rather than one. The pipelining refers to having multiple database queries in sequence, and a query instance downstream can start processing records before its upstream component has processed all of its records.

For example, if the input is 8 candidate records, they might be provided in a round-robin fashion down four pipes, so records 1 and 5 go down the first pipe, 2 and 6 down the second, and so on. In one example, the modular extraction engine 125 might have 3 database components, where the first is a general high-level query, perhaps revealing some information at the lot-level, like whether the lot went through a WET insertion. For example, if 3 of the candidate records do not find a match; those 3 records die there, and the 5 that do find a match continue downstream. The second component might be a wafer-level query which reveals what wafers were tested at the insertion(s) and possibly whether the test name(s) requested were actually measured. Again one or more records might not find a match (e.g., perhaps the requested test name was not used). The remaining records proceed downstream, perhaps to a site-level query in which the actual test results for the lots and wafers and test names are revealed. Inherent in this process is the pipelining; as soon as query results start returning from the database, they are fed downstream. For example the second query above would convert a lot-level input into wafer-level details, so one record in might generate 25 records out. That first wafer-level record out can be on its way through the third query before the 25th wafer-level record is even returned from the data store 110.

This approach has advantages over a conventional extraction technique that serves general queries using a view or join of several tables and apply the "where clauses" at the view. Depending on the joins, the data store 110 might have to do a lot of unproductive work because the query is one big unit. In contrast, the modular extraction engine 125 queries the individual tables that comprise the view, in such a way that it starts at a more general table and works to a more detailed table. As the modular extraction engine 125 proceeds, it identifies surrogate keys and other fields that will make the 2nd and subsequent queries more efficient (e.g. use a primary key index).

The modular extraction engine 125 generates an output report 175 that collects the data from the one or more data stores 110 that house the data referenced by the user query and packages the data in a uniform format. For example, the intermediate data extracted by the modular extraction engine 125 from a particular data store 110 may be in a certain format unique to the provider or operator of the data store 110. The modular extraction engine 125 may perform data transformations, such as row/column pivot, cleansing, aggregation, and population to create a resultant output data set. The use may specify a particular output format, depending on the particular use for the data. For example, if the user intends to process the data using a third-party software application, the modular extraction engine 125 may package the data in a universal format, such as comma-separated value (CSV) format or to a proprietary format specified by the third-party vendor. For purposes of this description, the output report 175 may be a data file or a hard copy, for example. The output report 175 may also be presented on a display device for review by the user.

Figure 5:
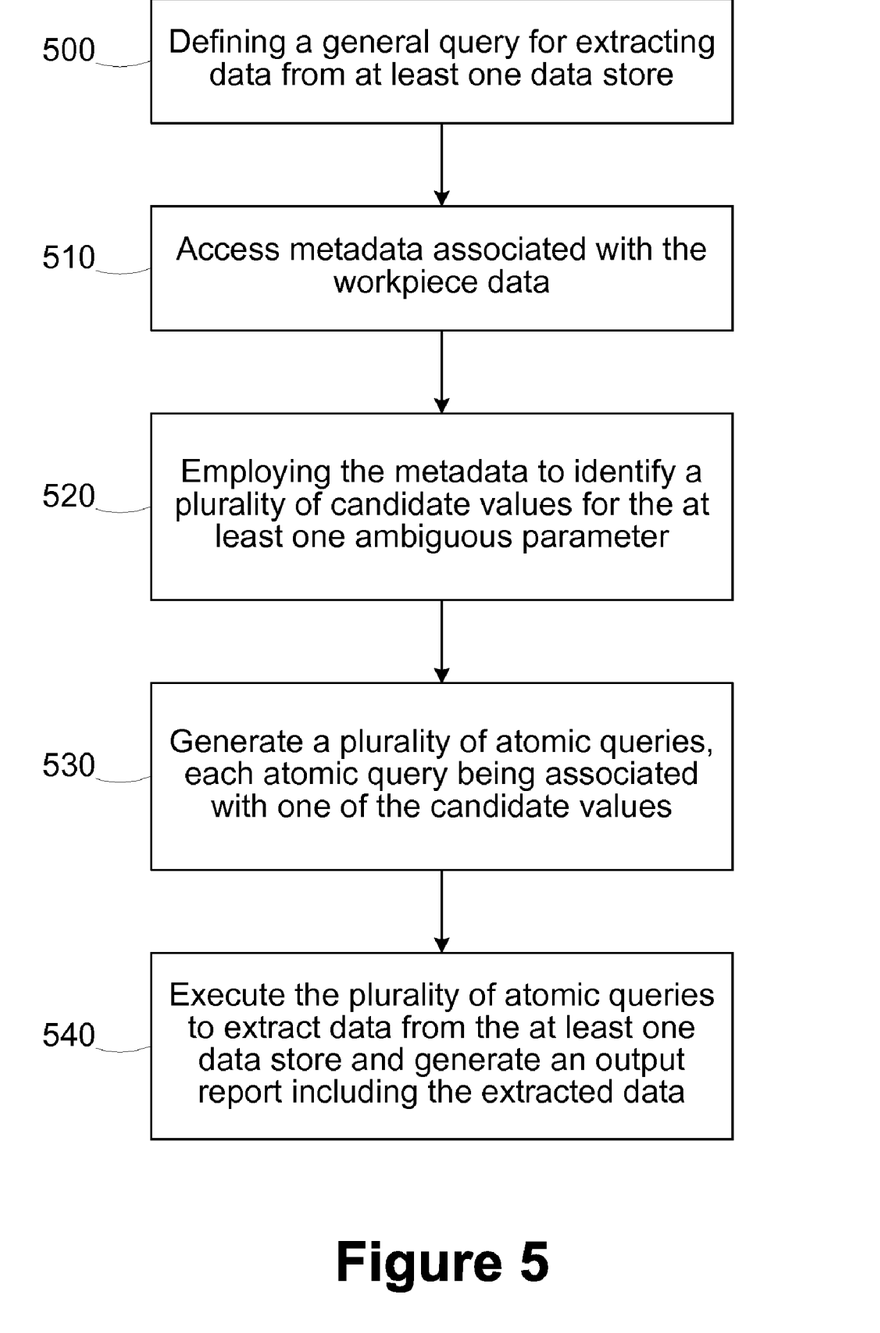
FIG. 5 is a simplified flow diagram of a method for extracting data in accordance with another illustrative embodiment of the present subject matter.

Turning now to FIG. 5, a simplified flow diagram of a method for extracting data from a data management system is provided. In method block 500, a general query is defined for extracting data from at least one data store operable to store workpiece data associated with the processing of workpieces in a manufacturing system, the general query specifying at least one ambiguous parameter having a plurality of potential values. In method block 510, metadata associated with the workpiece data is accessed. In method block 520, the metadata is employed to identify a plurality of candidate values for the at least one ambiguous parameter. In method block 530, a plurality of atomic queries is defined. Each atomic query is associated with one of the candidate values. In method block 540, the plurality of atomic queries is executed to extract data from the at least one data store and generate an output report including the extracted data.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A method, comprising:
   defining a general query for extracting data from at least one data store operable to store workpiece data associated with the processing of workpieces in a manufacturing system, the general query specifying at least one ambiguous parameter having a plurality of potential values, wherein the general query includes a material designator identifying a subset of workpieces, a process flow designator identifying at least one process flow event performed on workpieces in the manufacturing system, and a procedure designator identifying at least one procedure associated with the at least one process flow event, wherein the ambiguous parameter comprises at least one of the material designator, the process flow designator, or the procedure designator;
   accessing metadata associated with the workpiece data;
   employing the metadata to identify a plurality of candidate values for the at least one ambiguous parameter;
   generating a plurality of atomic queries, each atomic query being associated with one of the candidate values; and
   executing the plurality of atomic queries to extract data from the at least one data store and generate an output report including the extracted data.

2. The method of claim 1, wherein the ambiguous parameter comprises a workpiece identification parameter.

3. The method of claim 2, wherein the workpieces are arranged into lots of multiple workpieces, and the workpiece identification parameter comprises a lot identification parameter.

4. The method of claim 1, wherein a plurality of procedures are associated with the particular process flow event, the metadata includes procedure data linking the procedures to the particular process flow event, and identifying the candidate values comprises identifying one candidate value for each of the procedures.

5. The method of claim 1, wherein the general query specifies at least a first ambiguous parameter and a second ambiguous parameter, identifying the plurality of candidate values comprises identifying a first plurality of candidate values for the first ambiguous parameter and identifying a second plurality of candidate values for the second ambiguous parameter, and generating the plurality of atomic queries comprises generating atomic queries covering different combinations of the first and second pluralities of candidate values.

6. The method of claim 1, wherein the general query specifies a time window, the metadata comprises workpiece history information indicating process flow events performed on the workpieces in the manufacturing system, and employing the metadata comprises identifying, for a particular workpiece, process flow events performed during the time window.

7. The method of claim 6, wherein the ambiguous parameter comprises the process flow designator, a plurality of procedures are associated with the particular process flow event, the metadata includes procedure data linking the procedures to the particular process flow event, and identifying the candidate values comprises identifying one candidate value for each of the procedures linked to the particular process flow event.

8. The method of claim 1, wherein the workpieces comprise semiconductor wafers processed in a fabrication system, the material designator identifies a subset of the semiconductor wafers, and the process flow designator identifies at least one process flow event performed on semiconductor wafers in the fabrication system.

9. The method of claim 1, wherein the workpieces comprise semiconductor devices processed in a test system, the material designator identifies a subset of the semiconductor devices, the process flow designator identifies at least one process flow event performed on semiconductor devices in the test system, and the procedure designator identifies at least one test procedure associated with the at least one process flow event.

10. The method of claim 1, wherein the at least one ambiguous parameter specifies at least one wildcard.

11. The method of claim 1, further comprising periodically accessing the at least one data store to populate the metadata.

12. A method, comprising:
defining a general query for extracting data from at least one data store operable to store workpiece data associated with the processing of semiconductor workpieces, the general query specifying a material parameter identifying a subset of the semiconductor workpieces, a process flow parameter designating at least one process flow event performed on the semiconductor workpieces, and a procedure parameter identifying at least one procedure associated with the at least one process flow event, wherein at least one of the material, process flow, and procedure parameters has a plurality of potential values;
accessing metadata associated with the semiconductor workpiece data;
employing the metadata to identify a plurality of candidate values for the plurality of potential values;
generating a plurality of atomic queries, each atomic query being associated with one of the candidate values; and
executing the plurality of atomic queries to extract data from the at least one data store and generate an output report including the extracted data.

13. The method of claim 12, wherein the workpieces are arranged into lots of multiple workpieces, and the material parameter comprises a lot identification parameter.

14. The method of claim 12, wherein a plurality of procedures are associated with the particular process flow event, the metadata includes procedure data linking the procedures to the particular process flow event, and identifying the candidate values comprises identifying one candidate value for each of the procedures.

15. The method of claim 12, wherein the general query specifies at least two of the material, process flow, and procedure parameters have a plurality of potential values, identifying the plurality of candidate values comprises identifying first and second pluralities of candidate values for the pluralities of potential values, and generating the plurality of atomic queries comprises generating atomic queries covering different combinations of the first and second pluralities of candidate values.

16. The method of claim 12, wherein the general query specifies a time window, the metadata comprises workpiece history information indicating process flow events performed on the workpieces, and employing the metadata comprises identifying, for a particular workpiece, process flow events performed during the time window.

17. The method of claim 16, wherein the process flow parameter designates a particular process flow event performed on workpieces in the manufacturing system, a plurality of procedures are associated with the particular process flow event, the metadata includes procedure data linking the procedures to the particular process flow event, and identifying the candidate values comprises identifying one candidate value for each of the procedures linked to the particular process flow event.

18. The method of claim 12, wherein the semiconductor workpieces comprise semiconductor wafers.

19. The method of claim 12, wherein the semiconductor workpieces comprise semiconductor devices processed in a test system.

20. The method of claim 12, wherein the at least one of the material, process flow, and procedure parameters having a plurality of potential values specifies at least one wildcard.

21. The method of claim 12, further comprising periodically accessing the at least one data store to populate the metadata.

22. A system, comprising:
at least one data store operable to store workpiece data associated with the processing of workpieces in a manufacturing system;
an interface implemented by a computing device and operable to define a general query for extracting data from the at least one data store, the general query specifying at least one ambiguous parameter having a plurality of potential values, wherein the general query includes a material designator identifying a subset of workpieces, a process flow designator identifying at least one process flow event performed on workpieces in the manufacturing system, and a procedure designator identifying at least one procedure associated with the at least one process flow event, wherein the ambiguous parameter comprises at least one of the material designator, the process flow designator, or the procedure designator;

an extraction tool implemented by the computing device and operable to access metadata associated with the workpiece data, employ the metadata to identify a plurality of candidate values for the at least one ambiguous parameter, and generate a plurality of atomic queries, each atomic query being associated with one of the candidate values; and an extraction engine implemented by the computing device and operable to execute the plurality of atomic queries to extract data from the at least one data store and generate an output report including the extracted data.

* * * * *